(12) United States Patent
Hung

(10) Patent No.: US 8,733,722 B2
(45) Date of Patent: May 27, 2014

(54) SUPPORT APPARATUS FOR SUSPENDING A DISPLAY

(71) Applicant: Modernsolid Industrial Co., Ltd., Taichung (TW)

(72) Inventor: Chin-Jui Hung, Taichung (TW)

(73) Assignee: Modernsolid Industrial Co., Ltd., Taichung (TW)

( * ) Notice: Subject to any disclaimer, the term of this patent is extended or adjusted under 35 U.S.C. 154(b) by 0 days.

(21) Appl. No.: 13/655,621

(22) Filed: Oct. 19, 2012

(65) Prior Publication Data

US 2013/0299658 A1 Nov. 14, 2013

(30) Foreign Application Priority Data

May 14, 2012 (TW) ............................. 101209093 A

(51) Int. Cl.
*A47C 31/00* (2006.01)
*F16M 11/02* (2006.01)
*F21V 21/14* (2006.01)

(52) U.S. Cl.
USPC ..................... 248/276.1; 248/284.1; 248/584; 248/123.11

(58) Field of Classification Search
CPC .............. F16M 11/24; F16M 11/2014; F16M 11/2092; F16M 11/08; F16M 11/04; F16M 2200/024; F16M 2200/063; F16M 2200/065; F16M 2200/044; Y10S 248/921; Y10S 248/919; Y10S 248/923
USPC ........................ 248/276.1, 284.1, 584, 123.11
See application file for complete search history.

(56) References Cited

U.S. PATENT DOCUMENTS

| | | | | |
|---|---|---|---|---|
| 3,981,340 | A * | 9/1976 | Anderson et al. | 248/345.1 |
| 4,160,536 | A * | 7/1979 | Krogsrud | 248/280.11 |
| 4,682,749 | A * | 7/1987 | Strater | 248/284.1 |
| 4,852,842 | A * | 8/1989 | O'Neill | 248/284.1 |
| 7,207,537 | B2 * | 4/2007 | Hung | 248/284.1 |
| 8,074,949 | B2 * | 12/2011 | Oddsen et al. | 248/276.1 |
| 2011/0147546 | A1 * | 6/2011 | Monsalve et al. | 248/122.1 |

* cited by examiner

*Primary Examiner* — Anita M King
(74) *Attorney, Agent, or Firm* — Whyte Hirschboeck Dudek S.C.

(57) ABSTRACT

A support apparatus for suspending a display includes two suspenders and two repositioning units. Each suspender includes a connection member, a joint member, and two parallel arms extending between and pivoted to the connection member and the joint member. Each repositioning unit is connected between a corresponding arm and a corresponding one of the connection member and the joint member, and includes a variable-length cylinder. One of the repositioning units further includes a linking rod having opposite ends connected pivotally and respectively to a corresponding variable-length cylinder and a corresponding one of the connection member and the joint member of a respective suspender.

12 Claims, 8 Drawing Sheets

SUPPORT APPARATUS FOR SUSPENDING A DISPLAY

CROSS-REFERENCE TO RELATED APPLICATION

This application claims priority to Taiwanese Application No. 101209093, filed on May 14, 2012.

BACKGROUND OF THE INVENTION

1. Field of the Invention

The invention relates to a support apparatus, and more particularly to a support apparatus for suspending a display.

2. Description of the Related Art

FIG. 1 shows a conventional support apparatus for suspending a display disclosed in U.S. Pat. No. 7,207,537 which includes a fixing base (not shown), an extending arm 11, a suspender 12, and a support member 13.

The fixing base is adapted to be fixed on a wall. The extending arm 11 includes a fixing portion (not shown) and a connection portion 111 disposed at opposite ends thereof.

The suspender 12 includes two joint members 14 respectively and pivotally connected to the connection portion 111 and the support member 13, two parallel arms 15 each having two opposite ends pivotally connected to the joint members 14, and a repositioning assembly 16.

The repositioning assembly 16 includes a bolt 17, a linking component 18, and a variable-length cylinder 19 (i.e., a pressure cylinder).

The bolt 17 is disposed at one of the joint members 14. The linking component 18 is movably sleeved on the bolt 17. The variable-length cylinder 19 has two opposite ends respectively and pivotally connected to a corresponding arm 15 and to the linking component 18.

The support member 13 is suitable for installation of the display.

Since the extending arm 11 is pivotally connected to the fixing base, the support member 13 is horizontally movable with respect to the fixing base. Through the four-bar linkage mechanism of the suspender 12, the support member 13 is vertically movable with respect to the connection portion 111. Therefore, the display may be moved to a desired position and may be positioned as desired using the variable-length cylinder 19 of the repositioning assembly 16.

However, the aforesaid conventional support apparatus has the following drawbacks:

1. Since the suspender 12 is vertically movable with respect to the extending arm 11, and the extending arm 11 is horizontally movable with respect to the fixing base, users may need to apply forces in different directions to adjust the support apparatus to the desired position, resulting in more time spent for position adjustment of the display.

2. During adjustment of the vertical position, the linking component 18 is moved with movement of the bolt 17 and moves one end of the variable-length cylinder 19, thereby resulting in a torque. Therefore, the variable-length cylinder 19 swings between the arms 15, and further movement is impeded when the variable-length cylinder 19 collides with one of the arms 15, so that the vertical swing angle of the suspender 12 is limited by a distance between the arms 15. In practical applications, the range of swing angle of the suspender 12 is about 55 degrees, resulting in limitations in flexibility during use.

3. Due to insufficient swing angle of the suspender 12, when the display is moved toward the wall for storage, there is a large gap formed between the display and the wall surface, resulting in additional occupied space when the display is stowed.

SUMMARY OF THE INVENTION

Therefore, an object of the present invention is to provide a support apparatus for suspending a display and capable of alleviating at least one of the aforesaid drawbacks of the prior art.

According to one aspect of the present invention, a support apparatus for suspending a display comprises:

two suspenders, each including a connection member, a joint member, and two parallel arms extending between the connection member and the joint member and having opposite ends connected pivotally and respectively to the connection member and the joint member, the joint members of the suspenders being connected to each other, said connection member of one of the suspenders being adapted for installation of the display; and two repositioning units, each being disposed at a respective one of the suspenders, having a first end connected to a corresponding one of the arms and a second end connected pivotally to a corresponding one of the connection member and the joint member of the respective one of the suspenders, and including a variable-length cylinder.

One of the repositioning units further includes a linking rod having opposite ends connected pivotally and respectively to the variable-length cylinder of said one of the repositioning units and to a corresponding one of the connection member and the joint member of the respective one of the suspenders.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
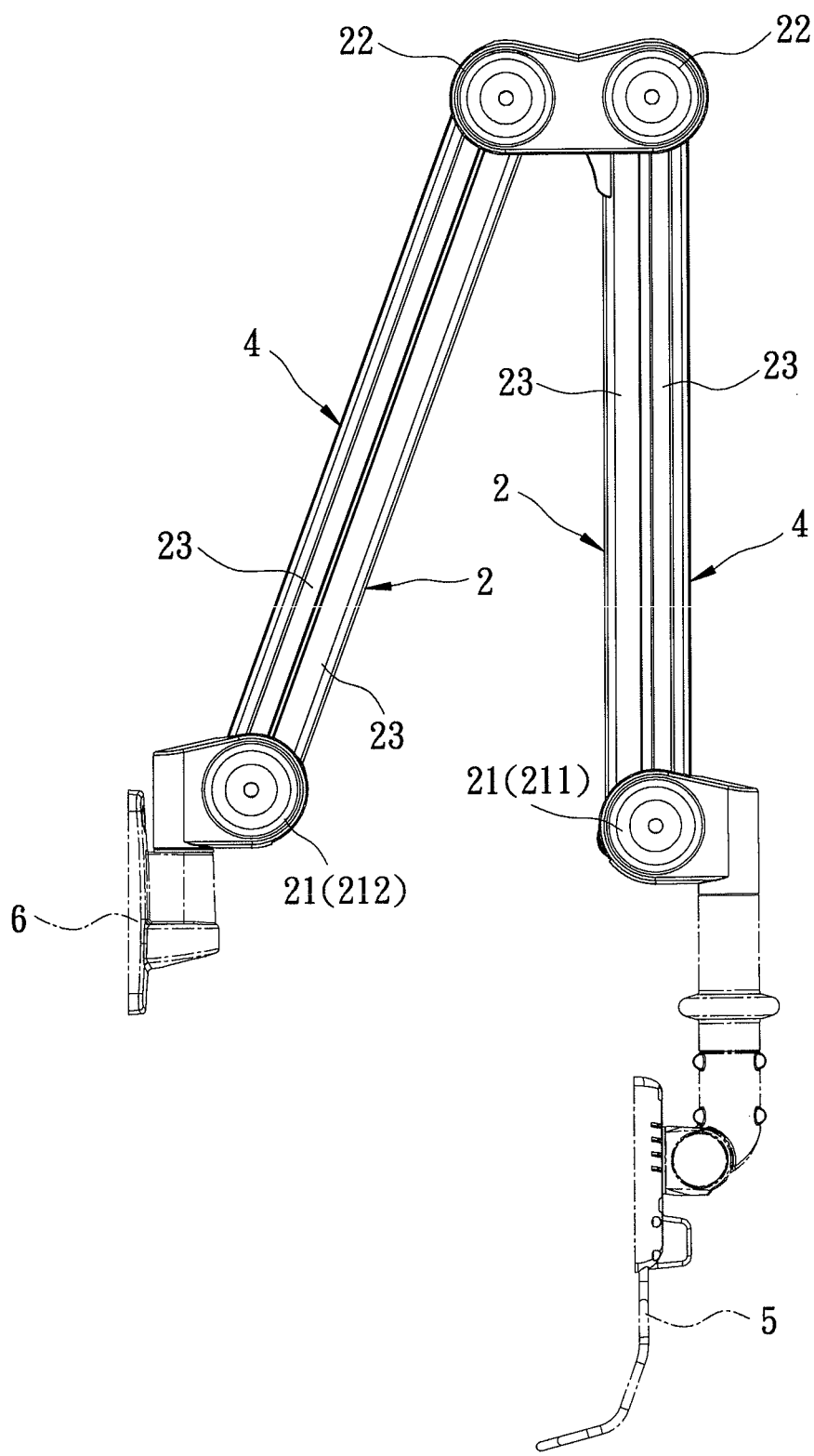
FIG. 2 is a schematic side view showing a preferred embodiment of the support apparatus for suspending a display according to the present invention.
Figure 3:
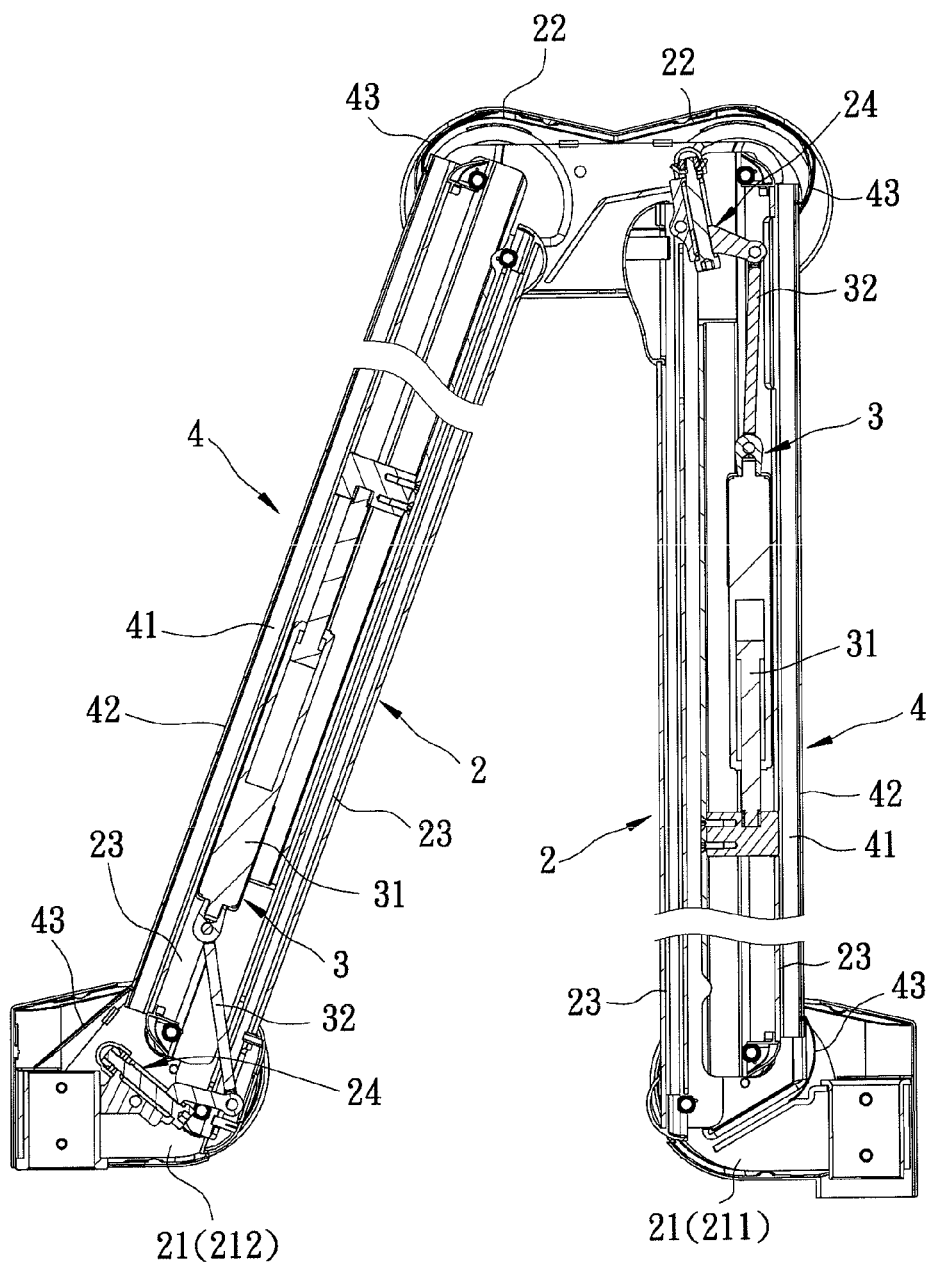
FIG. 3 is a sectional view of the preferred embodiment.
Figure 4:
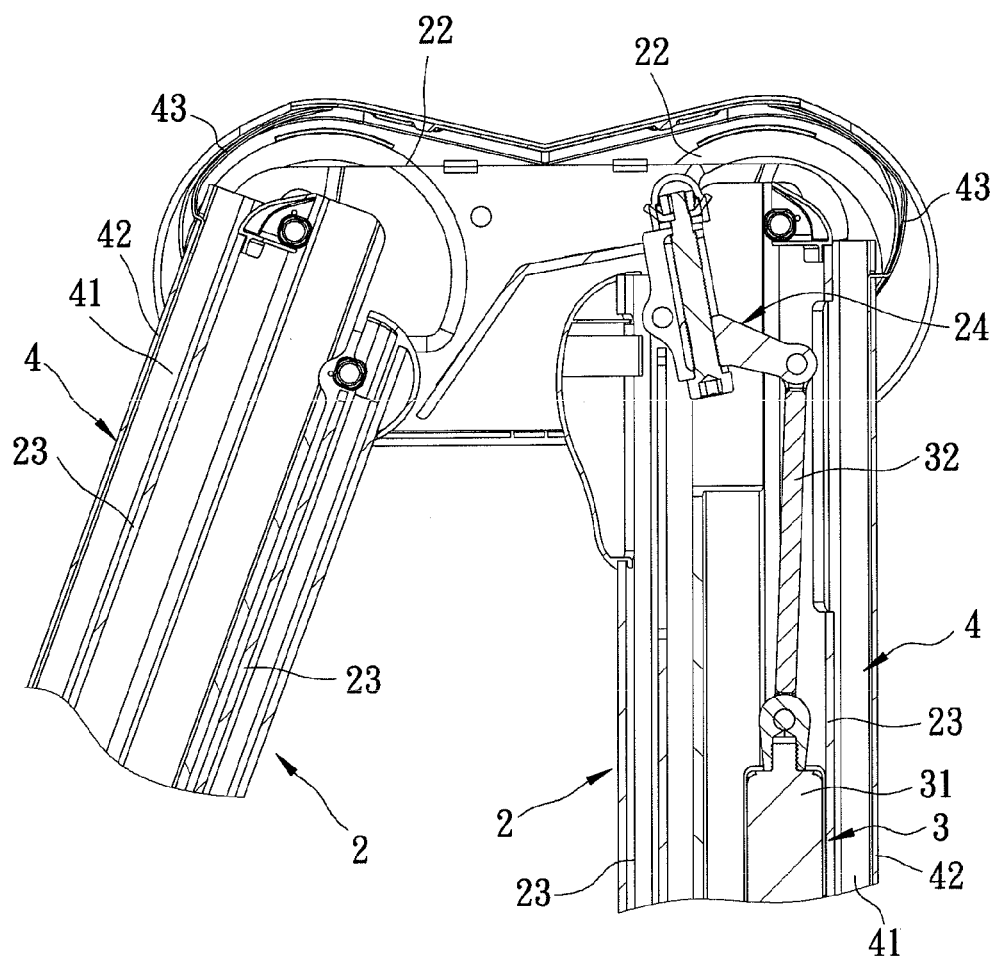
FIG. 4 is an enlarged fragmentary view from FIG. 3.

Referring to FIGS. 2, 3, and 4, the preferred embodiment of the support apparatus according to this invention is shown to include two suspenders 2, two repositioning units 3, and two cable organizers 4. It is noted that the support apparatus may include only one suspender 2 and one repositioning unit 3 in other embodiments of this invention.

Each suspender 2 includes a connection member 21, a joint member 22, and two parallel arms 23 extending between the connection member 21 and the joint member 22 and having opposite ends connected pivotally and respectively to the connection member 21 and the joint member 22.

To facilitate explanation, the connection members 21 herein are denoted as an active connection member 211 and a passive connection member 212. The active connection member 211 is adapted for pivotal installation of a display bracket 5 to connect with the display, and the passive connection member 212 is adapted for pivotal connection to a wall support 6 adapted to be fixed on a wall. Since the pivot mechanisms of the connection members 21 with the display bracket 5 and the wall support 6 are known in the art (see, for example, the disclosure in U.S. Pat. No. 7,207,537) and are not the feature of this invention, further details thereof are not provide herein for the sake of brevity.

The joint members 22 are connected fixedly to each other, and pivot axes of the arms 23 with the connection members 21 and the joint members 22 are parallel with each other, so that the arms 23 of the suspenders 2 move in a same plane. In this embodiment, the joint members 22 are integrally formed.

In this embodiment, the arms 23 are U-shaped in cross-section, and the arms 23 of each suspender 2 oppose each other, so that the suspenders 2 are hollow.

Each repositioning unit 3 is disposed in a respective suspender 2, has a first end connected to a corresponding arm 23 and a second end connected pivotally to a corresponding one of the connection member 21 and the joint member 22, and includes a variable-length cylinder 31 (i.e., a pressure cylinder).

For each suspender 2, one of the connection member 21 and the joint member to which the repositioning unit 3 is connected pivotally includes a linking part 24, and the repositioning unit 3 is connected pivotally to the linking part 24. In this embodiment, one of the linking parts 24 is included in the passive connection member 212, and the other linking part 24 is included in the joint member 22 of the other suspender 2.

In this embodiment, each repositioning unit 3 further includes a linking rod 32 having opposite ends connected pivotally and respectively to a corresponding variable-length cylinder 31 and a corresponding linking part 24 of a corresponding suspender 2. The linking rod 32 and the corresponding variable-length cylinder 31 form an included angle ranging between 100 degrees and 180 degrees therebetween. In this embodiment, the included angle is between 135 degrees and 180 degrees. It should be noted that, in other embodiments, only one of the repositioning units 3 may include the linking rod 32.

The cable organizers 4 are respectively disposed on the suspenders 2. Each cable organizer 4 includes a cable groove 41 formed in a corresponding arm 23, a shield 42 removably covering the cable groove 41, and two flexible coverings 43 respectively disposed at two opposite ends of the shield 42.

The coverings 43 are used to cover a respective gap formed between a corresponding arm 23 and a corresponding one of the connection member 21 and the joint member 22. It is noted that the size of the gap varies with movement of the suspenders 2. Each covering 43 has one end mounted to the shield 42 and another end movably extending into a respective one of the connection members 21 and the joint members 22. The coverings 43 are drawable into and out of the respective one of the connection members 21 and the joint members 22.

In use, upon pushing the display bracket 5, the position of the display bracket 5 is adjusted in height and depth directions that form a plane through the four-bar linkage mechanisms of the arms 23, and can be adjusted in a width direction through a pivot connection of the active connection member 211 with the display bracket 5 and a pivot connection of the passive connection member 212 with the wall support 6.

Figure 5:
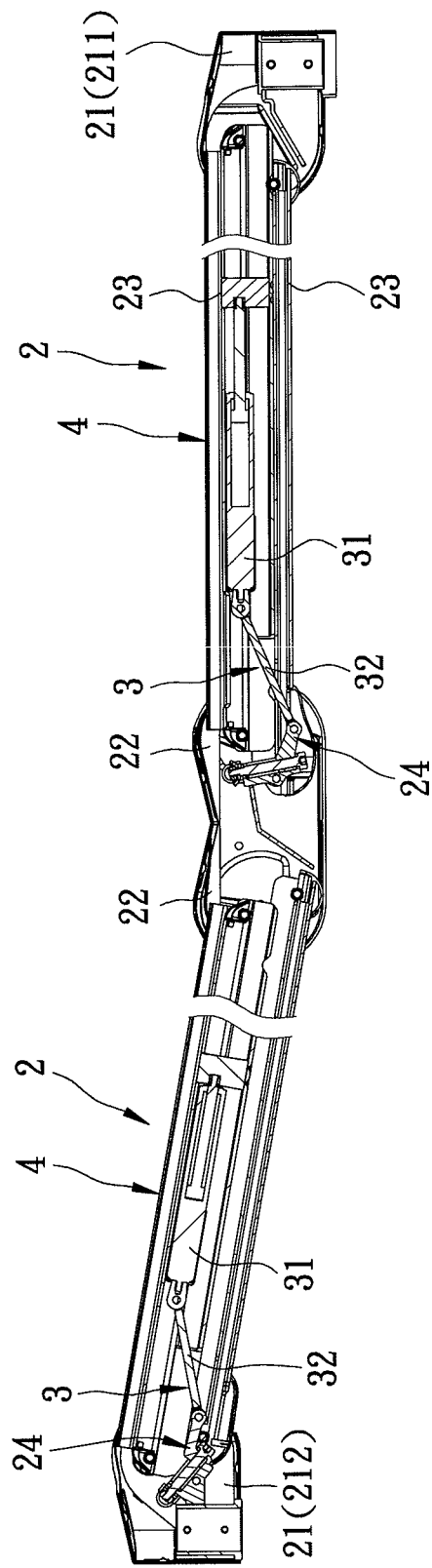
FIG. 5 is a sectional view showing the preferred embodiment in a state of use.
Figure 6:
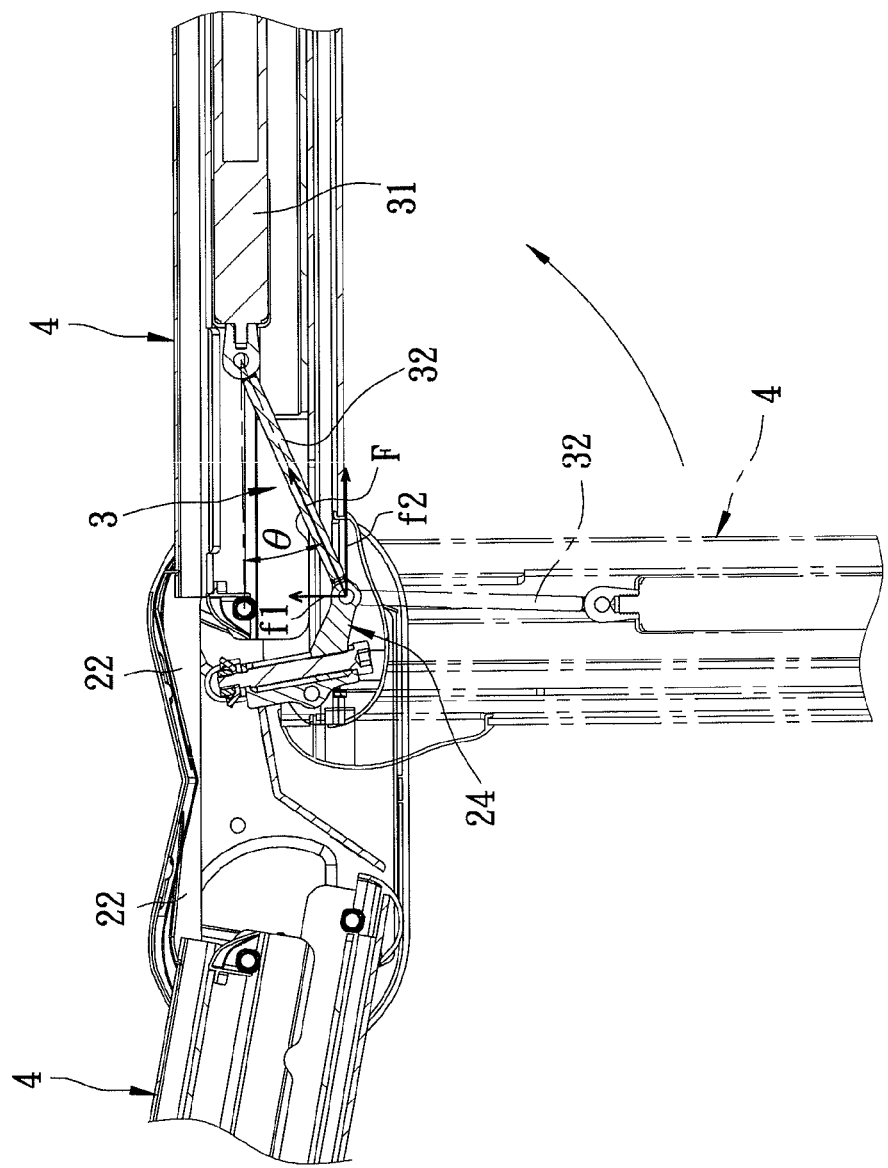
FIG. 6 is an enlarged fragmentary view from FIG. 5.
Figure 7:
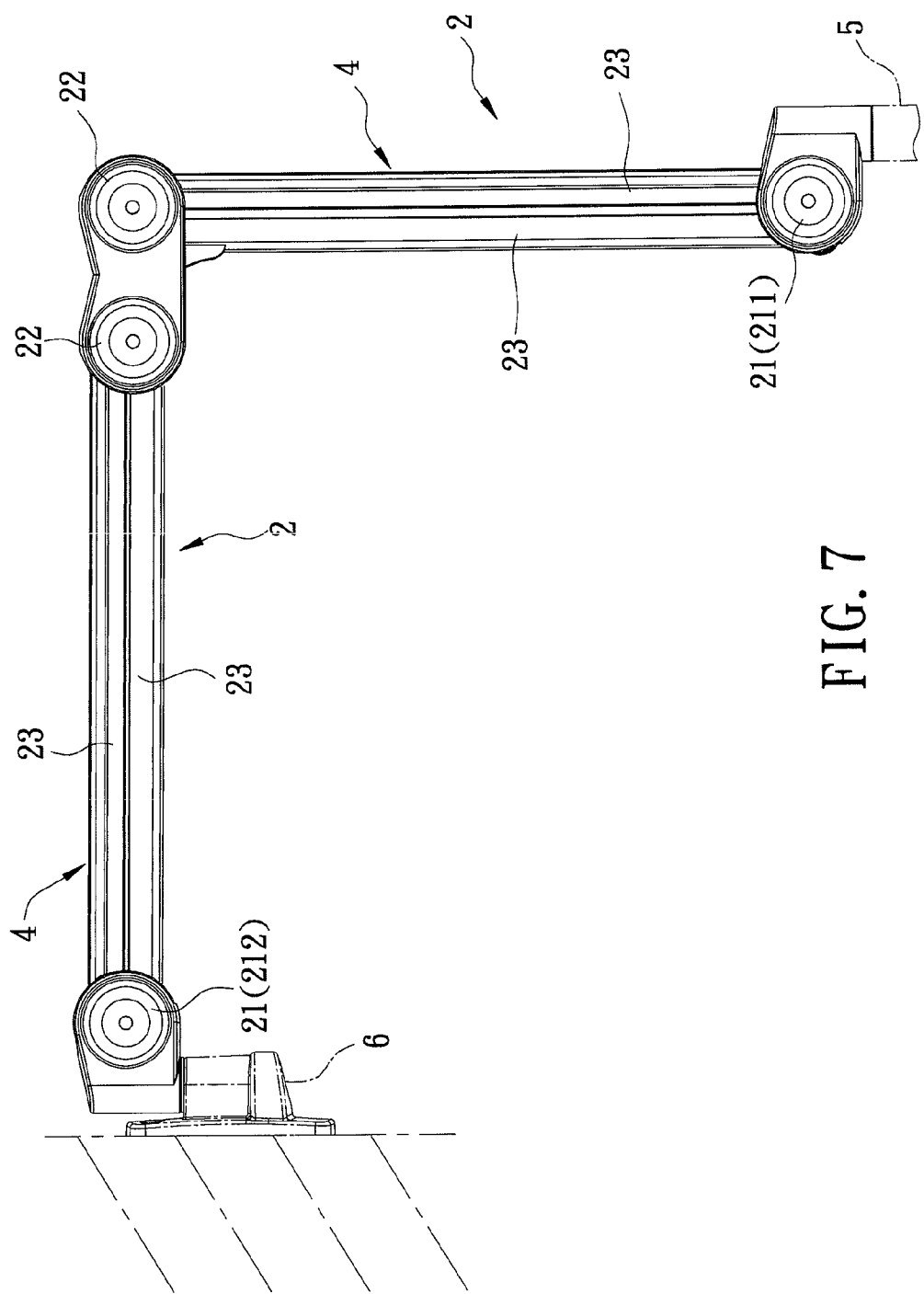
FIG. 7 is a schematic view showing the preferred embodiment in a state of use.
Figure 8:
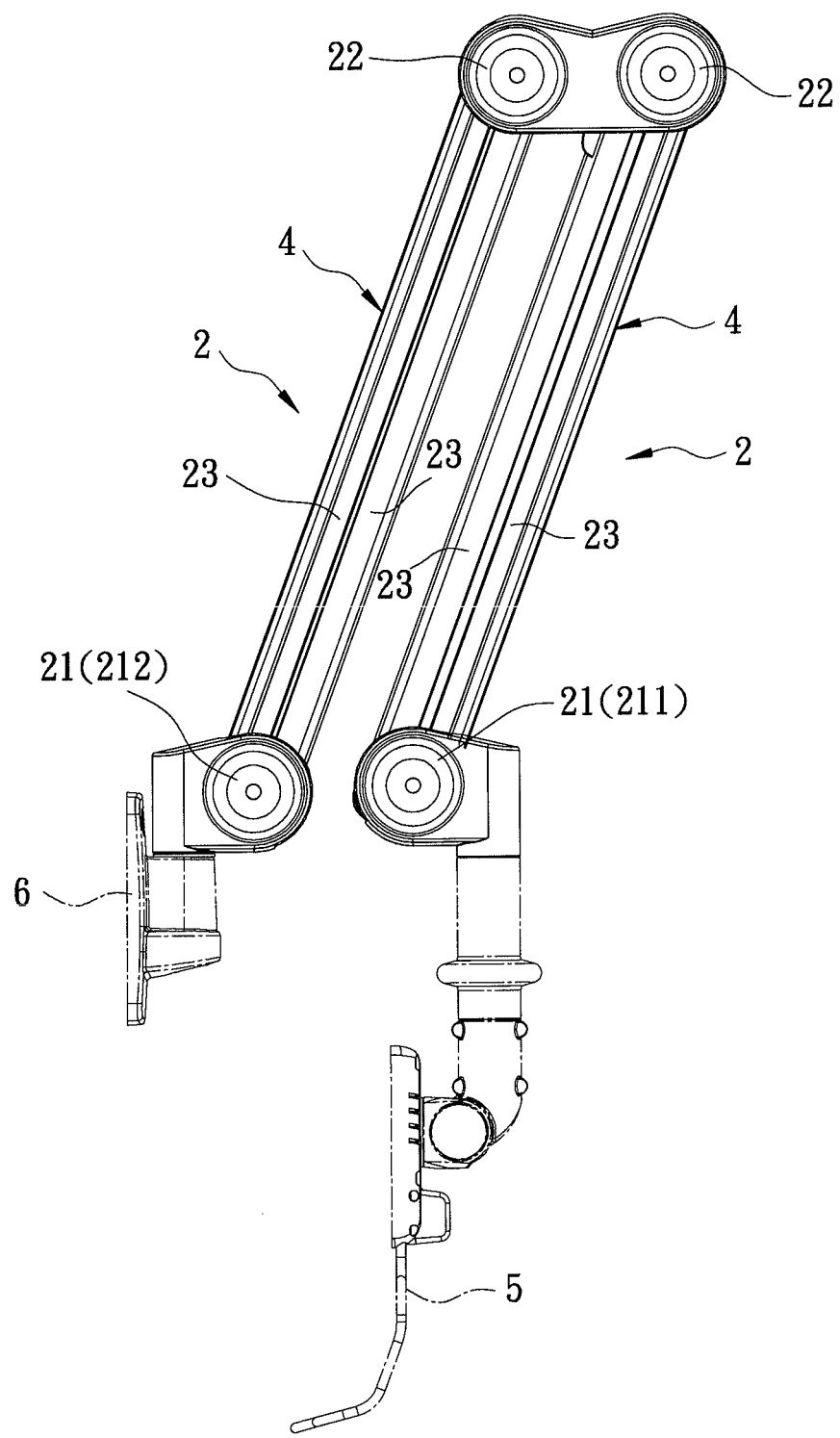
FIG. 8 is a schematic view showing the preferred embodiment in a state of storage.

Referring to FIGS. 5, 7, and 8, the present invention uses each linking rod 32 to swing between the corresponding arms 23. Compared to the aforementioned conventional support apparatus shown in FIG. 1 that uses the variable-length cylinder 19 to swing between the arms 15, because the length of the linking rod 32 is shorter than that of the variable-length cylinder 19, the linking rod 32 used in this invention has a larger swing angle θ without requiring an increase in the distance between the arms 23, as shown in FIG. 6, resulting in a larger swing angle of the suspenders 2. The support apparatus can thus be miniaturized without reducing the swing angle θ and can have greater flexibility in operation. Moreover, the included angle between the suspenders 2 can be adjusted as desired to facilitate user viewing, as shown in FIGS. 5 and 7. When the display is not in use, the support apparatus of this invention can be stowed against the wall to reduce the occupied space, as shown in FIG. 8.

Figure 1:
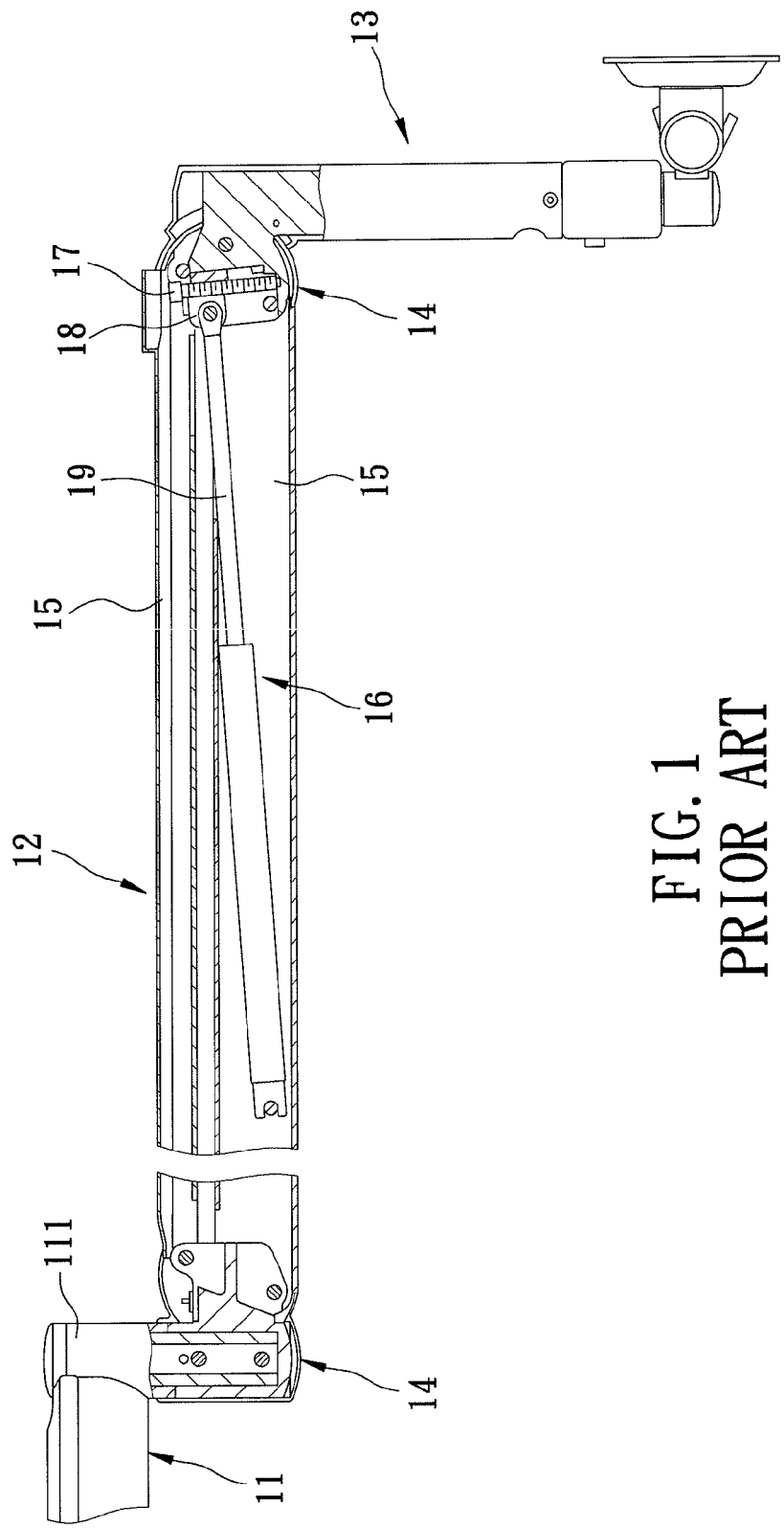
FIG. 1 is a sectional view of a conventional support apparatus for suspending a display.

Referring to FIGS. 4, 5, and 6, compared to the conventional support apparatus shown in FIG. 1 that uses the variable-length cylinder 19 to swing in the four-bar linkage mechanism, the present invention uses the variable-length cylinders 31 that extend parallel to the arms 23 and the linking rods 32 that are connected to the variable-length cylinders 31 and the linking parts 24. Upon pushing the display bracket 5, the force (denoted as F in FIG. 6) is applied to the linking rod 32 through the linking part 24, and results in a rotating force component (denoted as f1 in FIG. 6) to rotate the linking rod 32 and a pushing force component (denoted as f2 in FIG. 6) to push the variable-length cylinder 31, thereby reducing a required force to move the suspender 2 to a desired position.

It should be noted that, in this embodiment, the suspenders 2 move in a same plane. In other embodiments, the suspenders 2 may respectively move in two crossing planes.

To sum up, through the aforesaid structure, the present invention has the following advantages:

1. The suspenders 2 move in a same plane, so that the included angle therebetween can be adjusted by a force applied in a single direction, and height and depth positions of the display bracket 5 can be adjusted in a single operation. The suspenders 2 are then respectively positioned through the repositioning units 3, thus saving time spent for position adjustment.

2. The linking rods 32 are pivotally connected between the linking parts 24 and the variable-length cylinders 31, resulting in a large swing angle between the arms 23 without requiring an increase in the distance between the arms 23, thereby having better swing flexibility.

3. Due to better swing flexibility, the suspenders 2 may be collapsed when the display is not in use. Moreover, swing and positioning in the support apparatus of this invention are respectively completed through the linking rods 32 and the variable-length cylinders 31, which are two independent systems, so that the distance between the arms 23 may be reduced without decreasing the swing angle θ by use of shorter linking rods 32. The volume of the support apparatus can thus be reduced to achieve better use of space.

4. Through use of the linking rods 32, the force applied to each linking rod 32 is separated into a rotating force component to rotate the linking rod 32 and a pushing force component to push the variable-length cylinder 31, so as to facilitate movement of the suspenders 2 to a desired position with a relatively small user applied force.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A support apparatus for suspending a display, comprising:
    two suspenders, each including a connection member, a joint member, and two parallel arms extending between said connection member and said joint member and having opposite ends connected pivotally and respectively to said connection member and said joint member, said joint members of said suspenders being connected to each other, said connection member of one of said suspenders being adapted for installation of the display; and
    two repositioning units, each being disposed at a respective one of said suspenders, having a first end connected to a corresponding one of said arms and a second end connected pivotally to a corresponding one of said connection member and said joint member of the respective one of said suspenders, and including a variable-length cylinder;
    wherein one of said repositioning units further includes a linking rod having opposite ends connected directly, pivotally and respectively to said variable-length cylinder of said one of said repositioning units and to a corresponding one of said connection member and said joint member of the respective one of said suspenders.

2. The support apparatus as claimed in claim 1, wherein said one of said connection member and said joint member corresponding to said one of said repositioning units that includes said linking rod is provided with a linking part, said linking rod being connected directly and pivotally to said linking part, such that said linking rod is rotatable with respect to said linking part about an axis parallel to pivot axes of said arms with said connection members and said joint members.

3. The support apparatus as claimed in claim 1, wherein both of said repositioning units include said linking rod.

4. The support apparatus as claimed in claim 3, wherein said variable-length cylinder extends parallel to said arms of the respective one of said suspenders.

5. The support apparatus as claimed in claim 1, wherein pivot axes of said arms with said connection members and said joint members are parallel with each other.

6. The support apparatus as claimed in claim 1, wherein said linking rod and said variable-length cylinder in a same one of said repositioning units form an included angle ranging between 100 degrees and 180 degrees therebetween.

7. The support apparatus as claimed in claim 1, further comprising two cable organizers respectively disposed on said suspenders, each of said cable organizers including a cable groove formed in a corresponding one of said arms, and a shield removably covering said cable groove.

8. The support apparatus as claimed in claim 7, wherein each of said cable organizers further includes two flexible coverings respectively disposed at two opposite ends of said shield, each of said coverings having one end mounted to said shield and another end extending to a respective one of said connection members and said joint members.

9. A support apparatus for suspending a display, comprising:
    a suspender including a connection member, a joint member, and two parallel arms extending between said connection member and said joint member and having opposite ends connected pivotally and respectively to said connection member and said joint member, said connection member being adapted for installation of the display; and
    a repositioning unit having a first end connected to one of said arms and a second end connected pivotally to one of said connection member and said joint member,
    said repositioning unit including a variable-length cylinder and a linking rod having opposite ends connected directly, pivotally and respectively to said variable-length cylinder and one of said connection member and said joint member.

10. The support apparatus as claimed in claim 9, wherein said one of said connection member and said joint member that is connected pivotally to said linking rod is provided with a linking part, said linking rod being connected directly and pivotally to said linking part, such that said linking rod is rotatable with respect to said linking part about an axis parallel to pivot axes of said arms with said connection member and said joint member.

11. The support apparatus as claimed in claim 9, wherein said variable-length cylinder extends parallel to said arms.

12. The support apparatus as claimed in claim 9, wherein said linking rod and said variable-length cylinder form an included angle ranging between 100 degrees and 180 degrees therebetween.

* * * * *